(12) United States Patent
Spinelli et al.

(10) Patent No.: US 11,501,506 B2
(45) Date of Patent: Nov. 15, 2022

(54) CONTAINER WITH A BRUSH APPLICATOR

(71) Applicants: Franco Spinelli, Henderson, NV (US); Leonard Salati, Bronx, NY (US)

(72) Inventors: Franco Spinelli, Henderson, NV (US); Leonard Salati, Bronx, NY (US)

(*) Notice: Subject to any disclaimer, the term of this patent is extended or adjusted under 35 U.S.C. 154(b) by 0 days.

(21) Appl. No.: 17/485,416

(22) Filed: Sep. 25, 2021

(65) Prior Publication Data
US 2022/0007813 A1 Jan. 13, 2022

Related U.S. Application Data

(63) Continuation-in-part of application No. 16/543,327, filed on Aug. 16, 2019, now Pat. No. 11,129,462.

(51) Int. Cl.
| | |
|---|---|
| *G06Q 10/08* | (2012.01) |
| *G06Q 50/00* | (2012.01) |
| *G06T 19/00* | (2011.01) |
| *A45D 34/04* | (2006.01) |
| *A45D 44/00* | (2006.01) |
| *G06T 11/00* | (2006.01) |
| *A45D 29/00* | (2006.01) |
| *A45D 34/00* | (2006.01) |

(52) U.S. Cl.
CPC .......... *G06T 19/006* (2013.01); *A45D 34/043* (2013.01); *A45D 34/045* (2013.01); *A45D 44/005* (2013.01); *G06Q 10/087* (2013.01); *G06Q 50/01* (2013.01); *G06T 11/001* (2013.01); *A45D 29/00* (2013.01); *A45D 2034/002* (2013.01); *A45D 2044/007* (2013.01)

(58) Field of Classification Search
CPC ............ A45D 34/045; A45D 2200/052; A45D 2200/05; A45D 2200/10
See application file for complete search history.

(56) References Cited

U.S. PATENT DOCUMENTS

| | | | |
|---|---|---|---|
| 6,872,020 B2* | 3/2005 | Epli ..................... | A45D 34/045 401/129 |
| 2020/0305579 A1* | 10/2020 | Yang ..................... | G06T 19/006 |
| 2021/0345016 A1* | 11/2021 | Nakano .............. | H04N 21/4307 |

FOREIGN PATENT DOCUMENTS

JP  2021077042 A * 5/2021

* cited by examiner

*Primary Examiner* — Daniel J Colilla
(74) *Attorney, Agent, or Firm* — Edmond DeFrank

(57) ABSTRACT

The embodiments disclose a method including providing a flexible extension brush housed in a brush sheath coupled to a smart cosmetic brush, providing a two-stage mechanism coupled to a flexible extension cap to actuate the flexible extension brush, providing a smart cosmetic container coupled to the smart cosmetic brush, providing digital electronic devices and sensors coupled to the smart cosmetic brush, providing digital electronic devices and sensors coupled to the smart cosmetic container, communicating with a smart cosmetic app from the smart cosmetic container to a cosmetic company to reorder cosmetic products automatically based on sensor volume detection, using the smart cosmetic app augmented reality to allow the purchaser to demonstrate to friends and family on social media different cosmetic products colors and materials appear on themselves, and interacting with cosmetic company videos displayed on the purchase digital device display for screen on screen presentations and purchaser follow along participation.

20 Claims, 15 Drawing Sheets

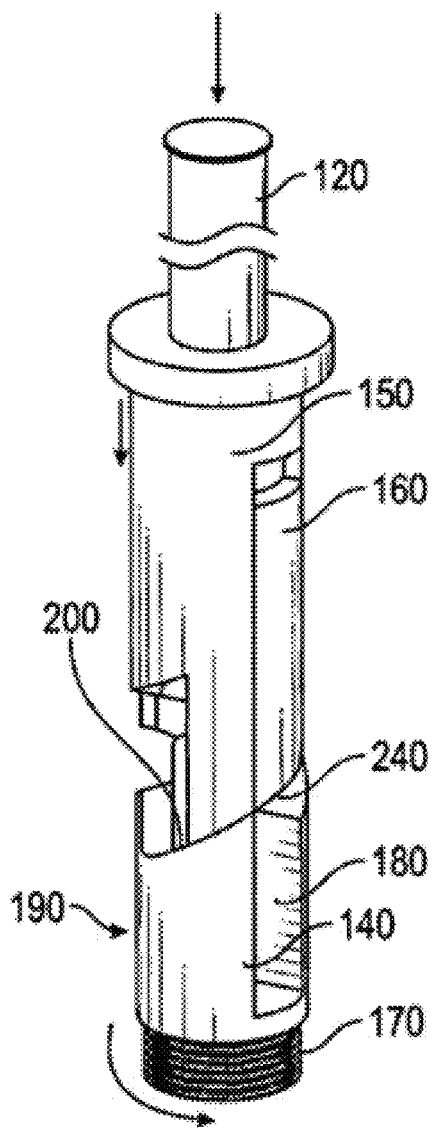 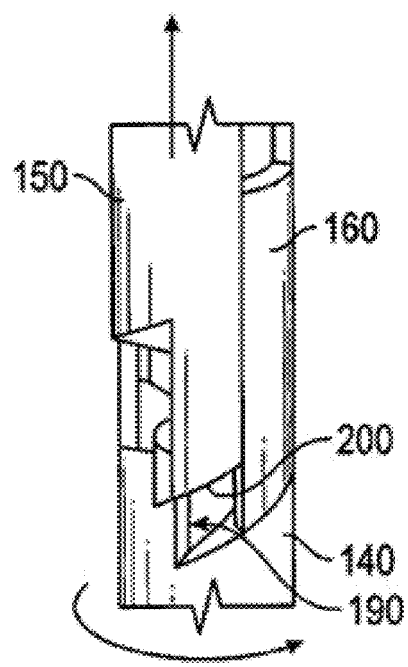
FIG. 3B  FIG. 3C

CONTAINER WITH A BRUSH APPLICATOR

CROSS-REFERENCE TO RELATED APPLICATIONS

This Patent Application is a Continuation-in part and claims priority to United States Patent Application entitled: "Container With A Brush Applicator", by Franco Spinelli et. al., U.S. Ser. No. 16/543,327 filed on Aug. 16, 2019, the U.S. Patent Application being incorporated herein by reference.

BACKGROUND

Nail polish containers that include brushes, and other containers that include applicators, are notorious for not providing a brush or applicator long enough to extend to all areas of an internal volume of the container. As a result, fluid such as nail polish or paint is wasted when it cannot be accessed.

Therefore, there is a need for a combination container and applicator that provides an extendible brush that can access all areas of a floor of the container. Such a needed invention would be able to retract the brush to preserve the shape of the brush and prevent damage of the brush bristles being splayed against the floor of the container for prolonged periods of time. Such a needed device would allow the brush to access all areas of the floor of the container even when a cap and brush of the container are not fully engaged with the container. The present invention accomplishes these objectives.

BRIEF DESCRIPTION OF THE DRAWINGS

FIG. 3B is a diagram of the brush extension mechanism of the cap showing an actuator and plunger being depressed to push a cam body downwardly to clear a stop member, portions of the cap and brush omitted for clarity of illustration.

FIG. 3C is a diagram of the plunger being retracted to allow a cam body to rotate to engage the stop member in a short stop member channel of the cam body, portions of the cap and brush omitted for clarity of illustration.

FIELD OF THE INVENTION

Figure 1:
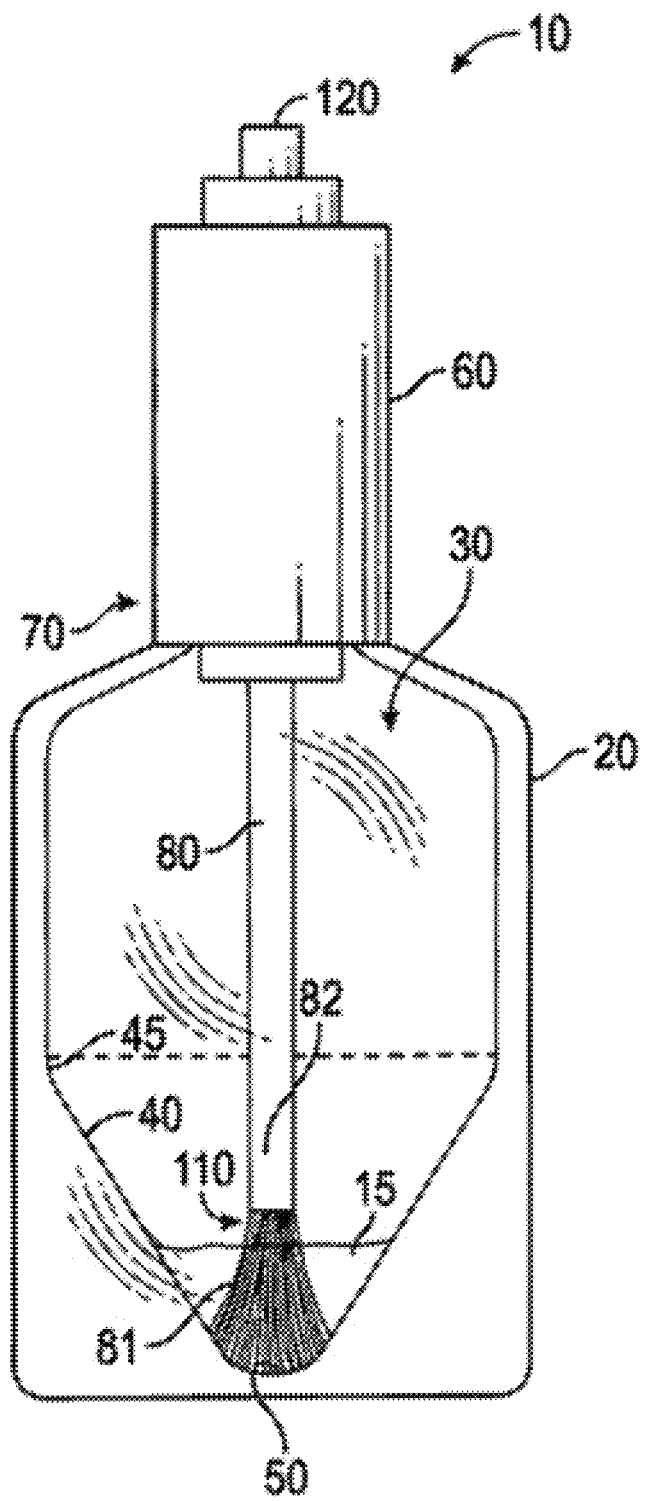
FIG. 1 is a front elevational view of the invention, partially broken away to reveal an interior volume within a container and a cap having a brush applicator, the brush in an extended position.

This invention relates to containers, and more particularly to a container having a built-in brush applicator.

SUMMARY OF THE INVENTION

The present device is a combination container and applicator for a fluid, such as nail polish, paint, or any other fluid that is typically applied with a brush or tool. A container has a top end open to an internal volume that has a tapered floor for pooling the fluid in a central location on the floor opposite the open top end.

A cap is adapted to engage the open top end of the container in a sealed and closed configuration. The cap has a brush applicator projecting downwardly therefrom into the internal volume of the container when the cap is in the sealed and closed configuration. The brush applicator preferably includes a brush and a sheath, the brush extending beyond the sheath when the brush applicator is in the extended position, and the brush retracting fully inside the sheath when the brush applicator is in the retracted position.

The brush applicator and the cap may be selectively removed from the container by unscrewing (or otherwise disengaging) the cap from the top end of the container and pulling the cap away from the container. Typically, the fluid retained by the brush is then applied to a workpiece, such as a person's fingernails, an object to be painted or cleaned, or the like. When more of the fluid is required, the brush applicator is inserted into the top end of the container so that the brush can be swept around the floor of the container manually to collect more fluid from all parts of the floor.

The cap includes a brush extension mechanism that is adapted to move the brush applicator between a retracted portion, such that the brush and brush applicator do not contact the floor of the container when the cap is in the sealed and closed configuration, and an extended position such that the brush is able to reach all areas of the floor of the container when the cap is contacting the open top end of the container but is not necessarily in the sealed and closed configuration.

The brush extension mechanism further includes an actuator projecting through the cap that is adapted to toggle the brush applicator between the extended position and the retracted position. The brush extension mechanism further includes a cam body fixed with the brush and the brush actuator, a plunger fixed with the actuator, at least one stop member fixed within the brush extension mechanism and fixed immovably with respect to the cap, and a spring urging the cam body upwardly against the plunger and the at least one stop member when in the retracted position and when the at least one stop member is fully seated in a long stop member channel of the cam body. The actuator causes the plunger to press against the cam body and spring until the cam body passes the at least one stop member. The cam body and plunger each have multiple angled and abutting surfaces that cause the cam body to rotate upon passing the at least one stop member at the urging of the spring. As such, the cam body advances so that the at least one stop member can engage a short stop member channel of the cam body to place the cam body, the brush applicator, and the brush in the extended position. The next press of the actuator causes the plunger to press downwardly again on the cam body so that it clears the at least one stop member and advances so that the long stop member channel of the cam body again becomes engaged with the at least one stop member in the retracted position. Each successive press of the actuator causes the brush applicator, brush, and cam body to toggle between the retracted and extended positions.

The brush extension mechanism described above has a one-to-one ratio of movement between the brush and the actuator. However, other brush extension mechanisms could be utilized that provide for a ratio greater than of movement of the brush with respect to the actuator, such as a 2:1 ratio of movement of the brush with respect to the actuator.

The present invention is a combination container and applicator that provides an extendible brush that can access all areas of a floor of the container. The present invention allows the user to selectively retract the brush to preserve the shape of the brush and prevent damage of the brush bristles being splayed against the floor of the container for prolonged periods of time. The present device allows the brush to access all areas of the floor of the container even when a cap and brush of the container are not fully engaged with the container. Other features and advantages of the present invention will become apparent from the following more detailed description, taken in conjunction with the accompanying drawings, which illustrate, by way of example, the principles of the invention.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of a container with a brush applicator is described for illustrative purposes and the underlying system can apply to any number and multiple types of products in a bottle container. In one embodiment of the present invention, the container with a brush applicator can be configured using a flexible brush extension. The container with a brush applicator can be configured to include a flexible tube brush extension and can be configured to include an articulated brush extension using the present invention.

Figure 2:
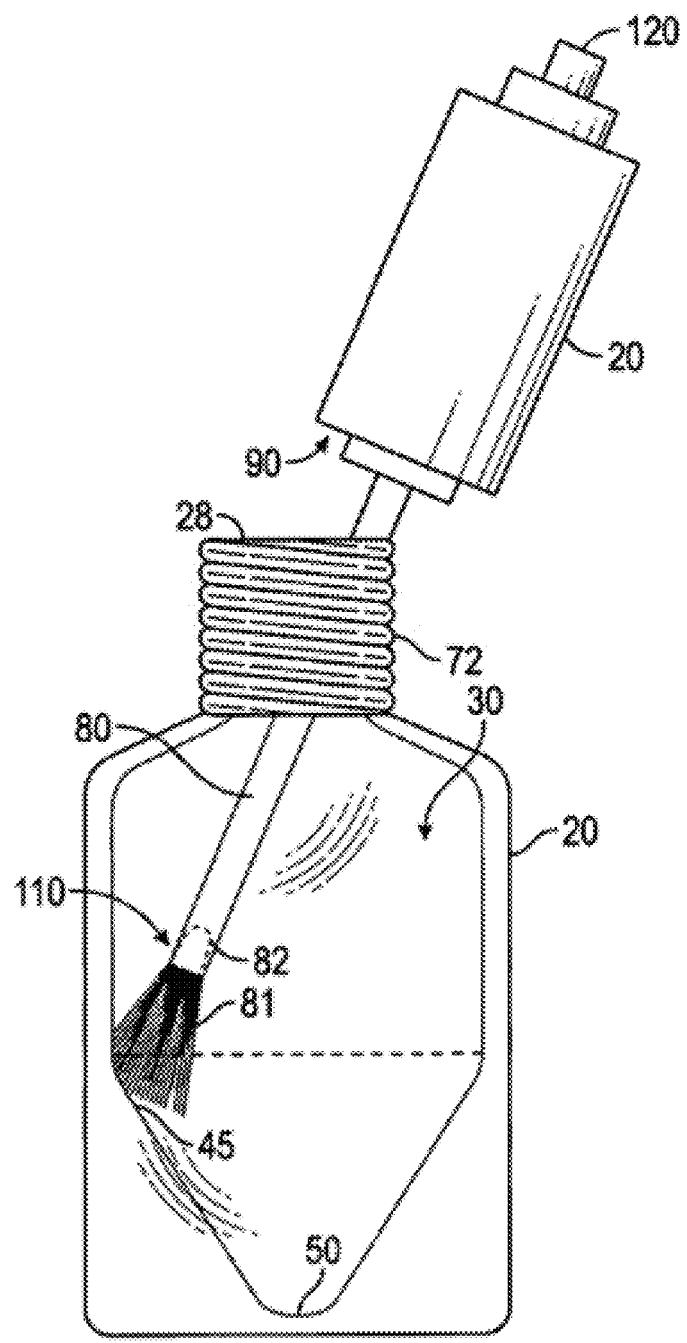
FIG. 2 is a front elevational view of the invention, partially broken away to illustrate the cap removed from the container and the brush accessing all areas of a floor of the container.
Figure 3A:
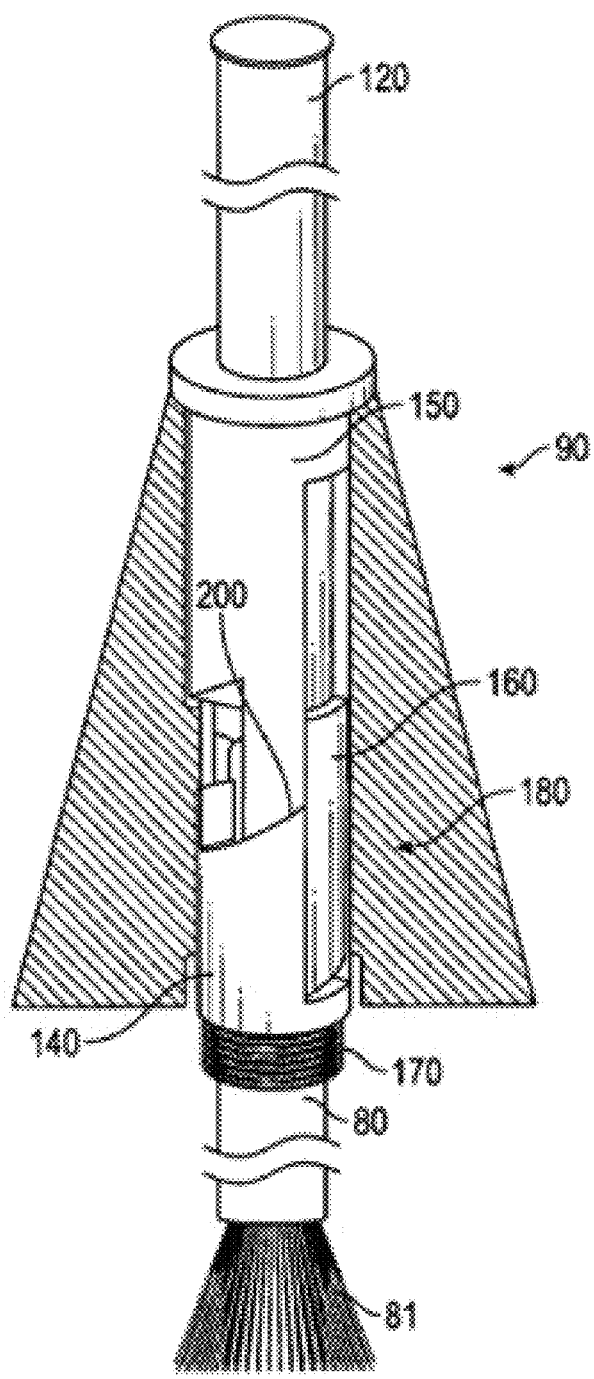
FIG. 3A is a diagram of a brush extension mechanism of the cap, the brush extension mechanism and brush in a retracted position.
Figure 3D:
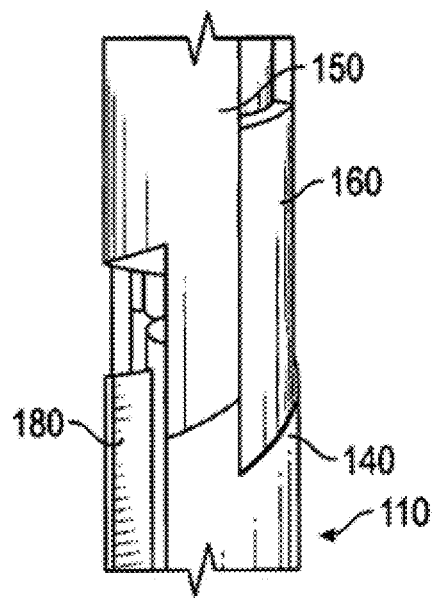
FIG. 3D is a diagram of the brush extension mechanism of the cap shown in an extended position, portions of the cap and brush omitted for clarity of illustration.
Figure 3E:
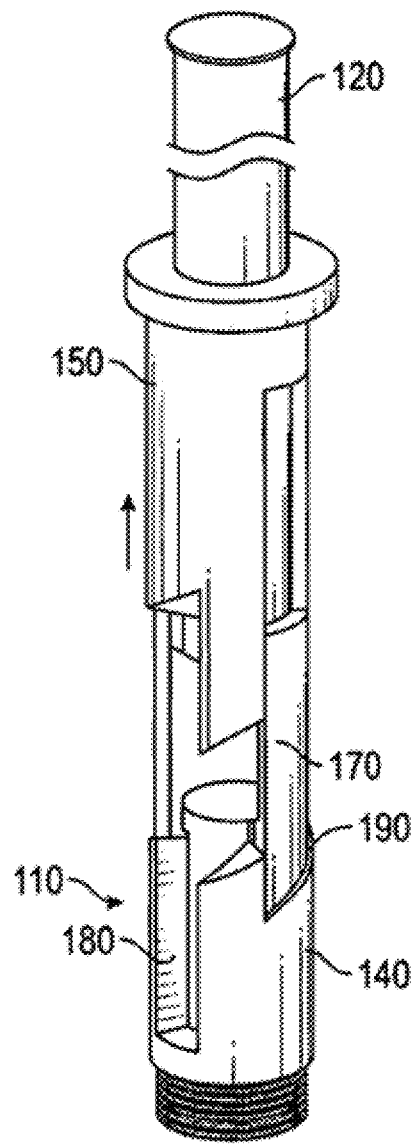
FIG. 3E is an alternate diagram of the brush extension mechanism of the cap shown in the extended position, portions of the cap and brush omitted for clarity of illustration.

FIGS. 1 and 2 illustrate a combination container and applicator 10 for a fluid 15, such as nail polish, paint, or any other fluid that is typically applied with a brush or tool. A container 20 has a top end 28 open to an internal volume 30 that has a tapered floor 40 for pooling the fluid in a central location 50 on the floor 40 opposite the open top end 28. In a normal orientation, the top end 28 is oriented upward and the floor 40 is oriented downward, so that fluid flows towards the central location 50 of the floor 40. Preferably the container is a rigid material such as glass, plastic, ceramic, metal, or the like.

A cap 60 is adapted to engage the open top end 28 of the container 20 in a sealed and closed configuration 70. Preferably the cap 60 includes internal threads that engage external threads of the top end 28. Other closure mechanisms, however, could also be used.

Figure 4:
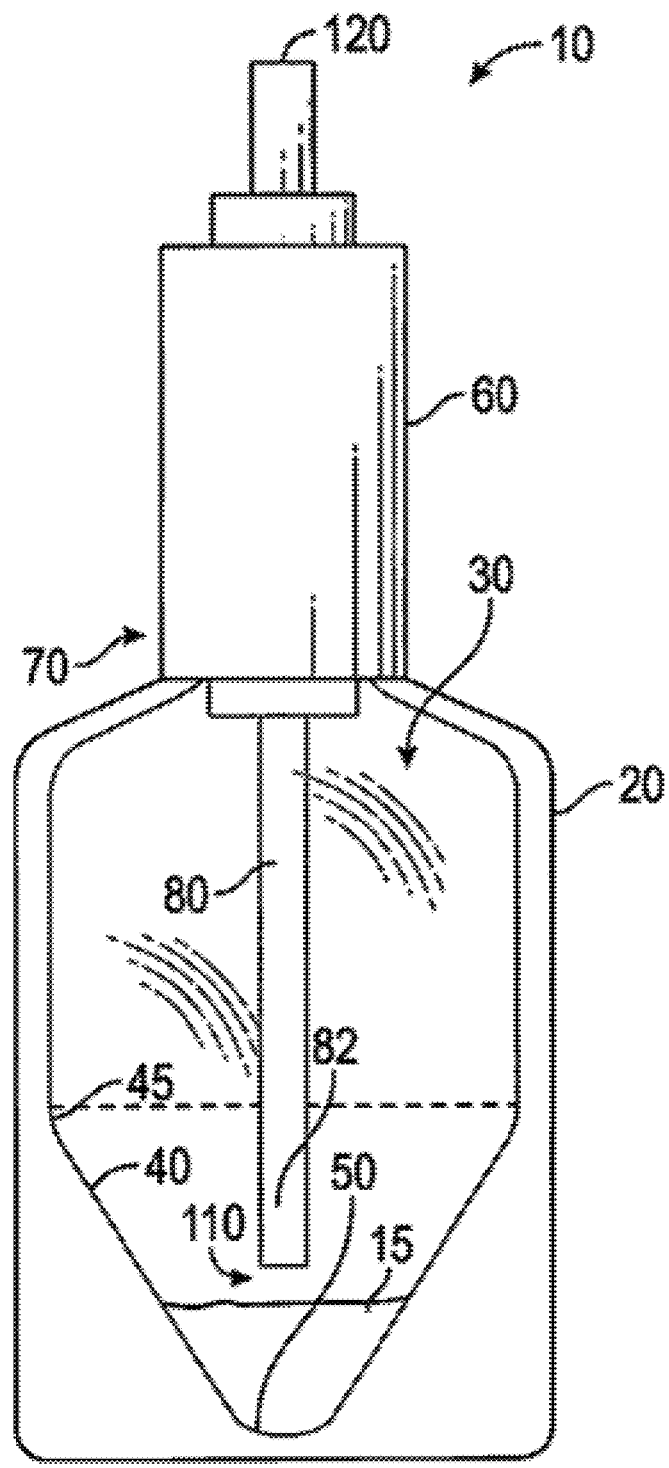
FIG. 4 is a front elevational view of the invention partially broken away to illustrate the brush and brush actuator in the retracted position and the cap fully engaged with the container in a sealed and closed configuration.

The cap 60 has a brush applicator 80 projecting downwardly therefrom into the internal volume 30 of the container 20 when the cap 60 is in the sealed and closed configuration 70 (FIG. 1). The brush applicator 80 preferably includes a brush 81 and a sheath 82, the brush 81 extending beyond the sheath 82 when the brush applicator 80 is in the extended position 110 (FIGS. 1 and 2), and the brush retracting fully inside the sheath 82 when the brush applicator 80 is in the retracted position 100 (FIG. 4). In the retracted position 100 the brush 81 is shaped by the sheath 82 and prevented from contacting the floor 40 so as to maintain a proper, tight shape of the brush 81, thereby inhibiting the bristles (not shown) of the brush 81 from becoming splayed.

The brush applicator 80 and the cap 60 may be selectively removed from the container 20 by unscrewing (or otherwise disengaging) the cap 60 from the top end 28 of the container 20 and pulling the cap 60 away from the container 20. Typically, the fluid 15 retained by the brush 81 is then applied to a workpiece (not shown), such as a person's fingernails, an object to be painted or cleaned, or the like. When more of the fluid 15 is required, the brush applicator 80 is inserted into the top end 28 of the container 20 so that the brush 81 can be swept around the floor 40 of the container manually to collect more fluid 15 from all parts of the floor 40.

The cap 60 includes a brush extension mechanism 90 that is adapted to move the brush applicator 80 between a retracted portion 100, such that the brush applicator does not contact the floor 40 of the container 20 when the cap 60 is in the sealed and closed configuration 70, and an extended position 110 such that the brush applicator 80 is able to reach all areas and corners 45 of the floor 40 of the container 20 when the cap 60 is contacting the open top end 28 of the container 20 but is not necessarily in the sealed and closed configuration 70.

The brush extension mechanism 90 further includes an actuator 120 projecting through the cap 60 that is adapted to toggle the brush applicator between the extended position 110 and the retracted position 90. Similar to the toggle mechanism in U.S. Pat. No. 3,205,863 to Rhoades on Sep. 14, 1965 (incorporated herein by reference), the brush extension mechanism 90 further includes a cam body 140 (FIGS. 3A-3E) fixed with the brush 81 and the brush actuator 80, a plunger 150 fixed with the actuator 120, at least one stop member 160 fixed within the brush extension mechanism 90 and fixed immovably with respect to the cap 60, and a spring 170 urging the cam body 140 upwardly against the plunger 150 and the at least one stop member 160 when in the retracted position 100 and when the at least one stop member 160 is fully seated in a long stop member channel 180 of the cam body 140.

The actuator 120 causes the plunger 150 to press against the cam body 140 and spring 170 until the cam body 140 passes the at least one stop member 160. The cam body 140 and plunger 150 each have multiple angled and abutting surfaces 200 that cause the cam body 140 to rotate upon passing the at least one stop member 160 at the urging of the spring 170. As such, the cam body 140 advances so that the at least one stop member 160 can engage a short stop member channel 190 of the cam body to place the cam body 140, the brush applicator 80, and the brush 81 in the extended position 110. The next press of the actuator 120 causes the plunger 150 to press downwardly again on the cam body 140 so that it clears the at least one stop member 160 and advances so that the long stop member channel 180 of the cam body 140 again becomes engaged with the at least one stop member 160 in the retracted position 100. Each successive press of the actuator 120 causes the brush applicator 80, brush 81, and cam body 140 to toggle between the retracted and extended positions 100,110. A second spring (not shown) may be included to urge the plunger 150 upwardly when released by the user.

The brush extension mechanism 90 described above has a one-to-one ratio of movement between the brush 81 and the actuator 120. However, other brush extension mechanisms 90 could be utilized that provide for a ratio greater than 1 of movement of the brush 81 with respect to the actuator 120, such as a 2:1 ratio of movement of the brush 81 with respect to the actuator 120.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention. The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

Figure 5A:
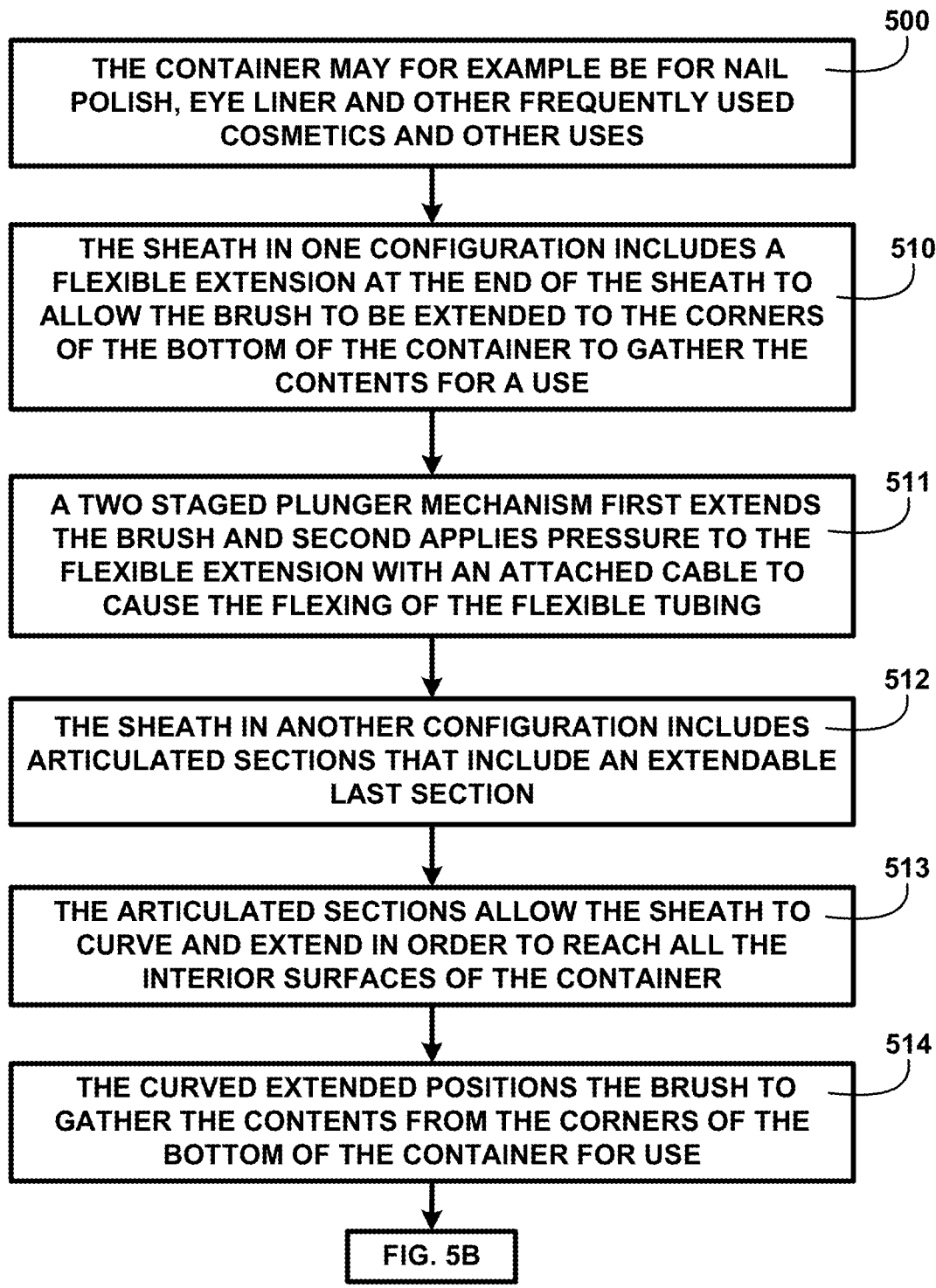
FIG. 5A shows a block diagram of an overview of flexible extension of one embodiment.

Flexible Extension:

FIG. 5A shows a block diagram of an overview of flexible extension of one embodiment. FIG. 5A shows the container may for example be for nail polish, eye liner and other frequently used cosmetics and other uses 500. The sheath in one configuration includes a flexible extension at the end of the sheath to allow the brush to be extended to the corners of the bottom of the container to gather the contents for a use 510. A two staged plunger mechanism first extends the brush and second applies pressure to the flexible extension with an attached cable to cause the flexing of the flexible tubing 511. The sheath in another configuration includes articulated sections that include an extendable last section 512. The articulated sections allow the sheath to curve and extend in order to reach all the interior surfaces of the container 513. The curved extended positions the brush to gather the contents from the corners of the bottom of the container for use 514 of one embodiment. Descriptions continue on FIG. 5B.

Figure 5B:
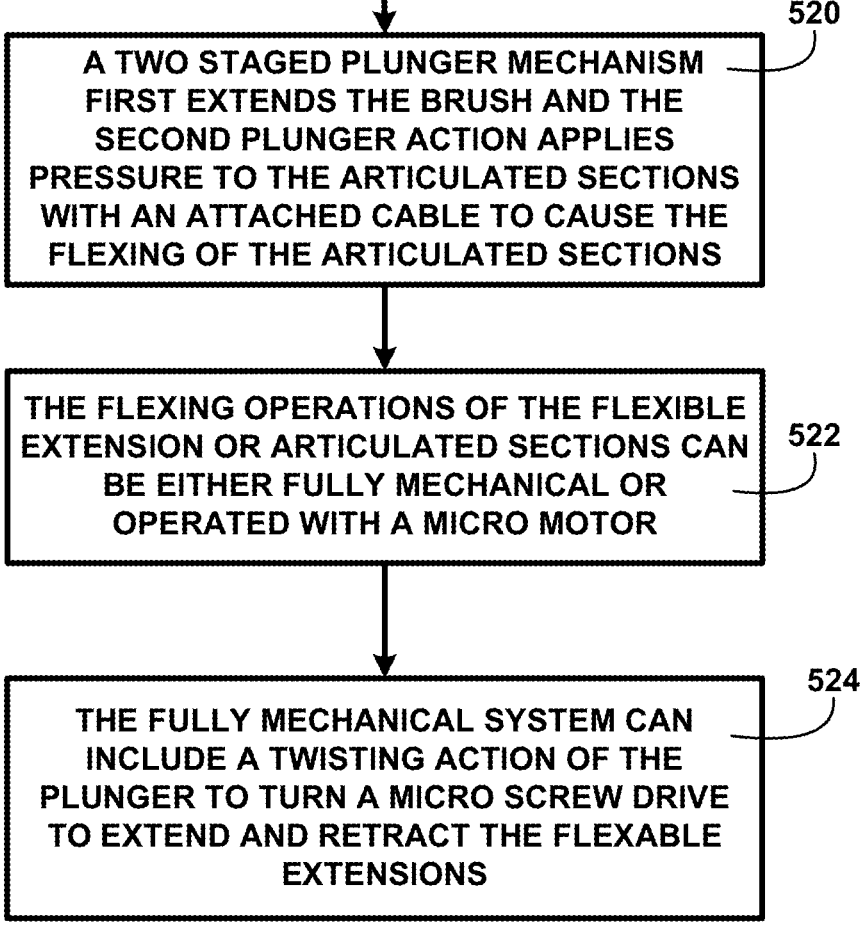
FIG. 5B shows a block diagram of an overview of two staged plunger mechanism of one embodiment.

Two Staged Plunger Mechanism:

FIG. 5B shows a block diagram of an overview of two staged plunger mechanism of one embodiment. FIG. 5B shows a continuation from FIG. 5A with a two staged plunger mechanism first extends the brush and the second plunger action applies pressure to the articulated sections with an attached cable to cause the flexing of the articulated sections 520. The flexing operations of the flexible extension or articulated sections can be either fully mechanical or operated with a micro motor 522. The fully mechanical system can include a twisting action of the plunger to turn a micro screw drive to extend and retract the flexible extensions 524 of one embodiment.

Figure 6:
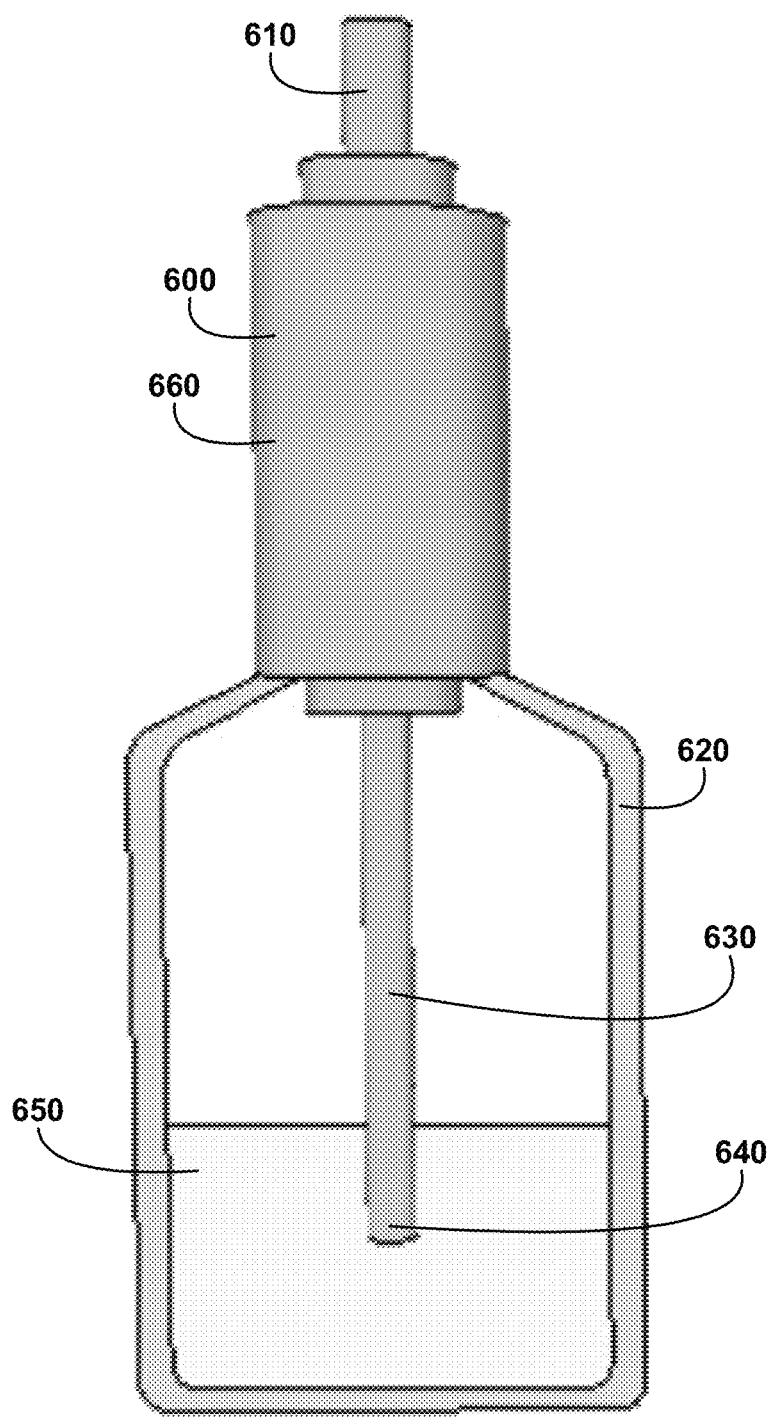
FIG. 6 shows for illustrative purposes only an example of retracted brush of one embodiment.

Retracted Brush:

FIG. 6 shows for illustrative purposes only an example of retracted brush of one embodiment. FIG. 6 shows a flexible extension cap 600 with a plunger in a retracted position 610 and a two-stage mechanism not shown 660. Coupled to the flexible extension cap 600 is an extendible sheath 630 with a retracted brush not shown 640. A container 620 is shown with a cylindrical interior showing with container contents 650 remaining inside the container 620 of one embodiment.

Figure 7:
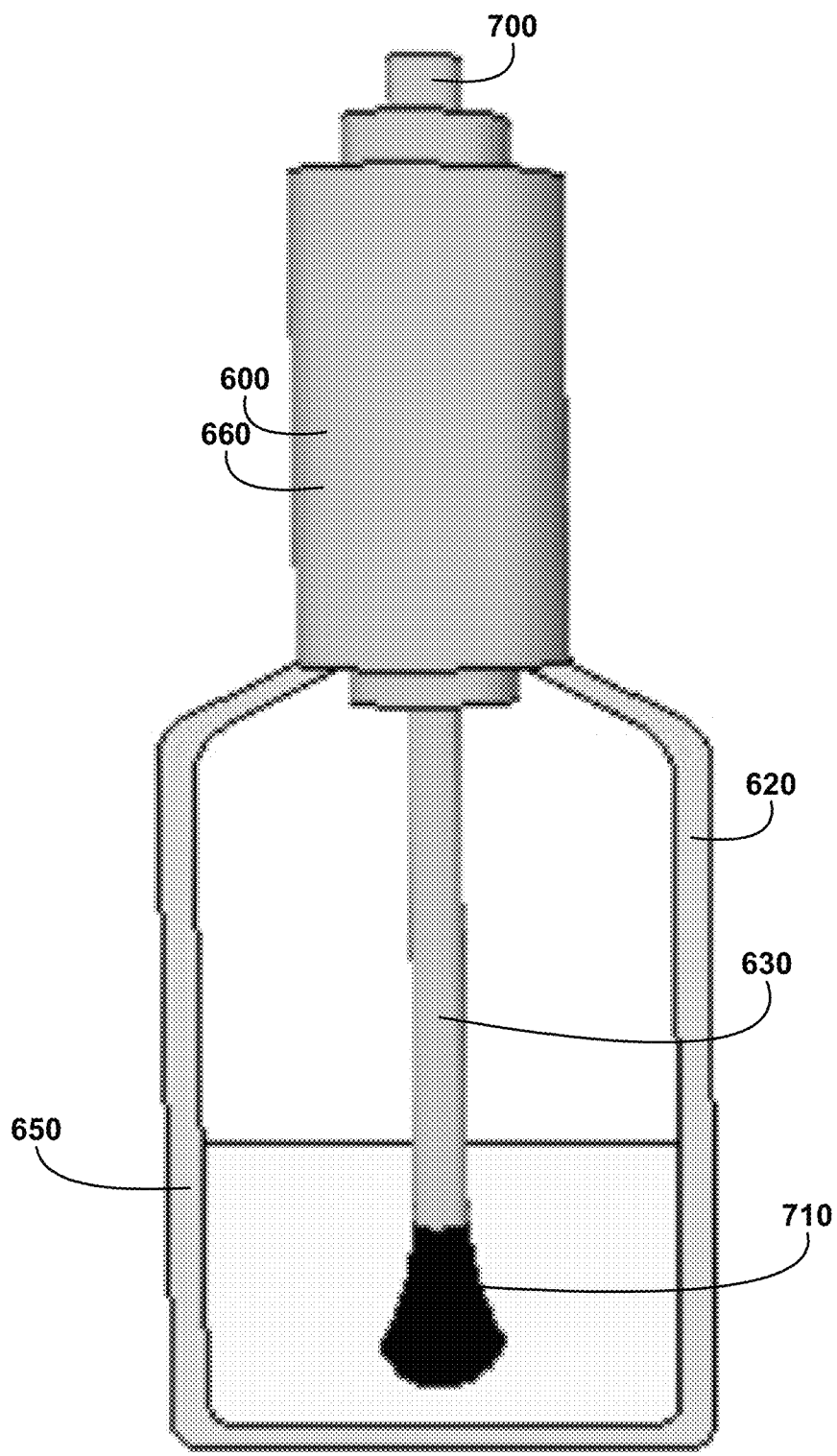
FIG. 7 shows for illustrative purposes only an example of extended brush of one embodiment.

Extended Brush:

FIG. 7 shows for illustrative purposes only an example of extended brush of one embodiment. FIG. 7 shows the flexible extension cap 600 with the plunger in an extended position 700 and the two-stage mechanism not shown 660. Also showing is the sheath 630 and an extended brush 710. The container 620 is shown with remaining container contents 650 inside of one embodiment.

Figure 8:
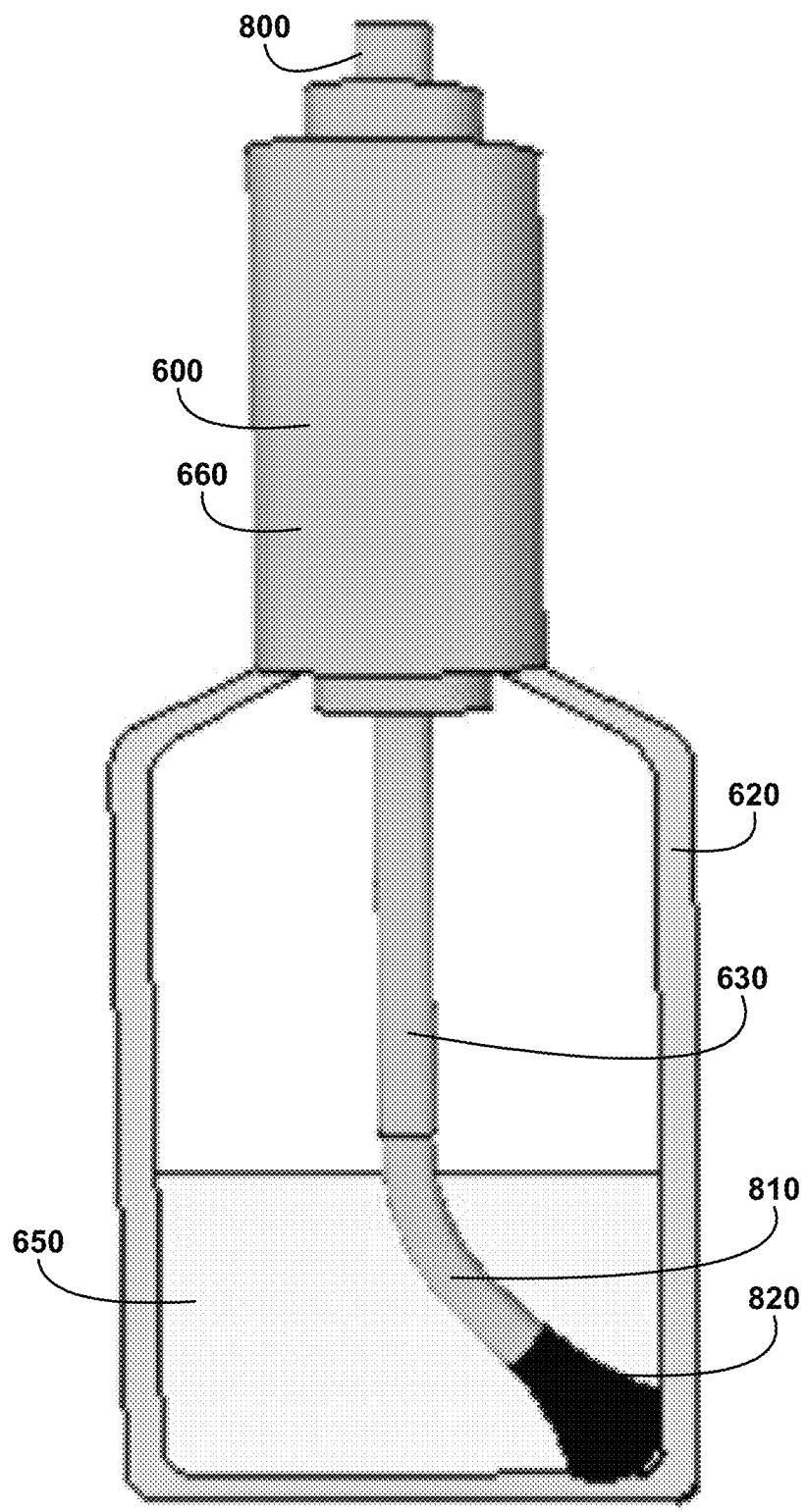
FIG. 8 shows for illustrative purposes only an example of curved flexible extension of one embodiment.

Curved Flexible Extension:

FIG. 8 shows for illustrative purposes only an example of curved flexible extension of one embodiment. FIG. 8 shows the flexible extension cap 600 with the plunger in a second stage extended position 800. The two-stage mechanism not shown 660 not shown is in a second extension stage that extends the flexible brush extension from the sheath 630. A curved extended flexible extension 810 is shown with an angled extended brush 820 reaching into the corner of the container. The container 620 shows the remaining container contents 650 of one embodiment.

Figure 9:
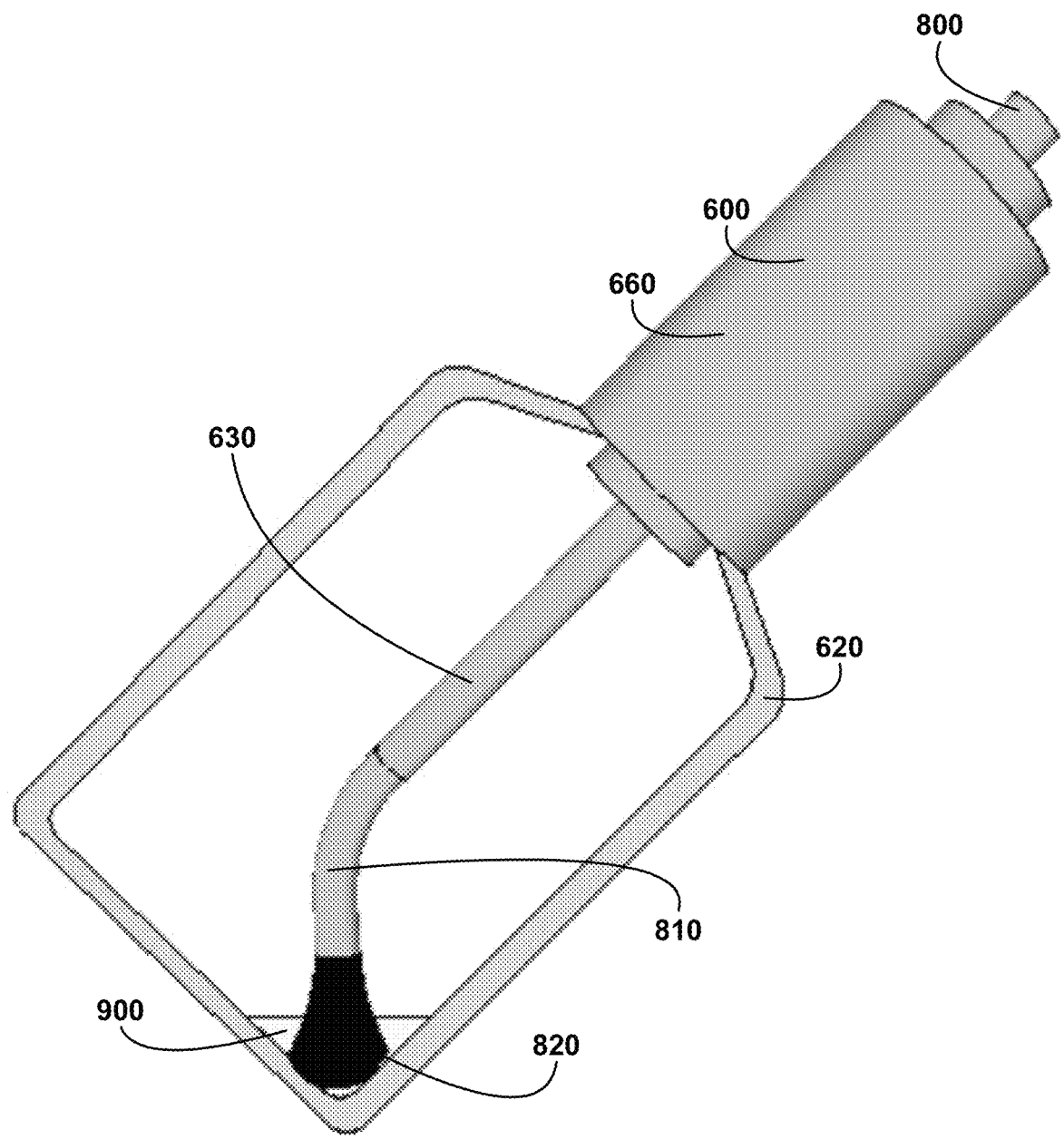
FIG. 9 shows for illustrative purposes only an example of curved flexible extension brush of one embodiment.

Curved Flexible Extension Brush:

FIG. 9 shows for illustrative purposes only an example of curved flexible extension brush of one embodiment. FIG. 9 shows the flexible extension cap 600 with the plunger in a second stage extended position 800 using the two-stage mechanism not shown 660. The sheath 630 also shows the curved extended flexible extension 810 and the angled extended brush 820. The container 620 is shown in a tilted position to pool the minimal remaining contents in the corner of the container 620. The container contents 650 pooled in the corner. The angled extended brush 820 easily reaches the container contents 650 for retrieval allowing the purchaser to get the benefit of the full contents of the product of one embodiment.

Figure 10:
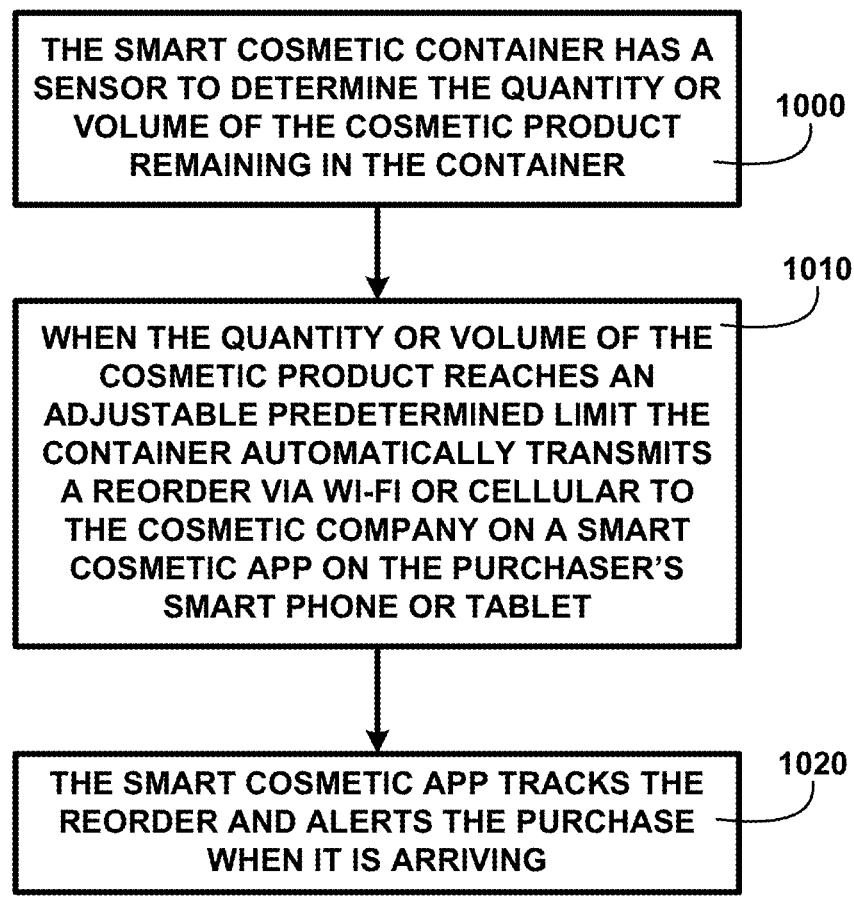
FIG. 10 shows a block diagram of an overview of smart cosmetic container of one embodiment.

Smart Cosmetic Container:

FIG. 10 shows a block diagram of an overview of smart cosmetic container of one embodiment. FIG. 10 shows a smart cosmetic container has a sensor to determine the quantity or volume of the cosmetic product remaining in the container 1000. When the quantity or volume of the cosmetic product reaches an adjustable predetermined limit the container automatically transmits a reorder via WI-FI or cellular to the cosmetic company on a smart cosmetic app on the purchaser's smart phone or tablet 1010. The smart cosmetic app tracks the reorder and alerts the purchase when it is arriving 1020 of one embodiment.

Figure 11:
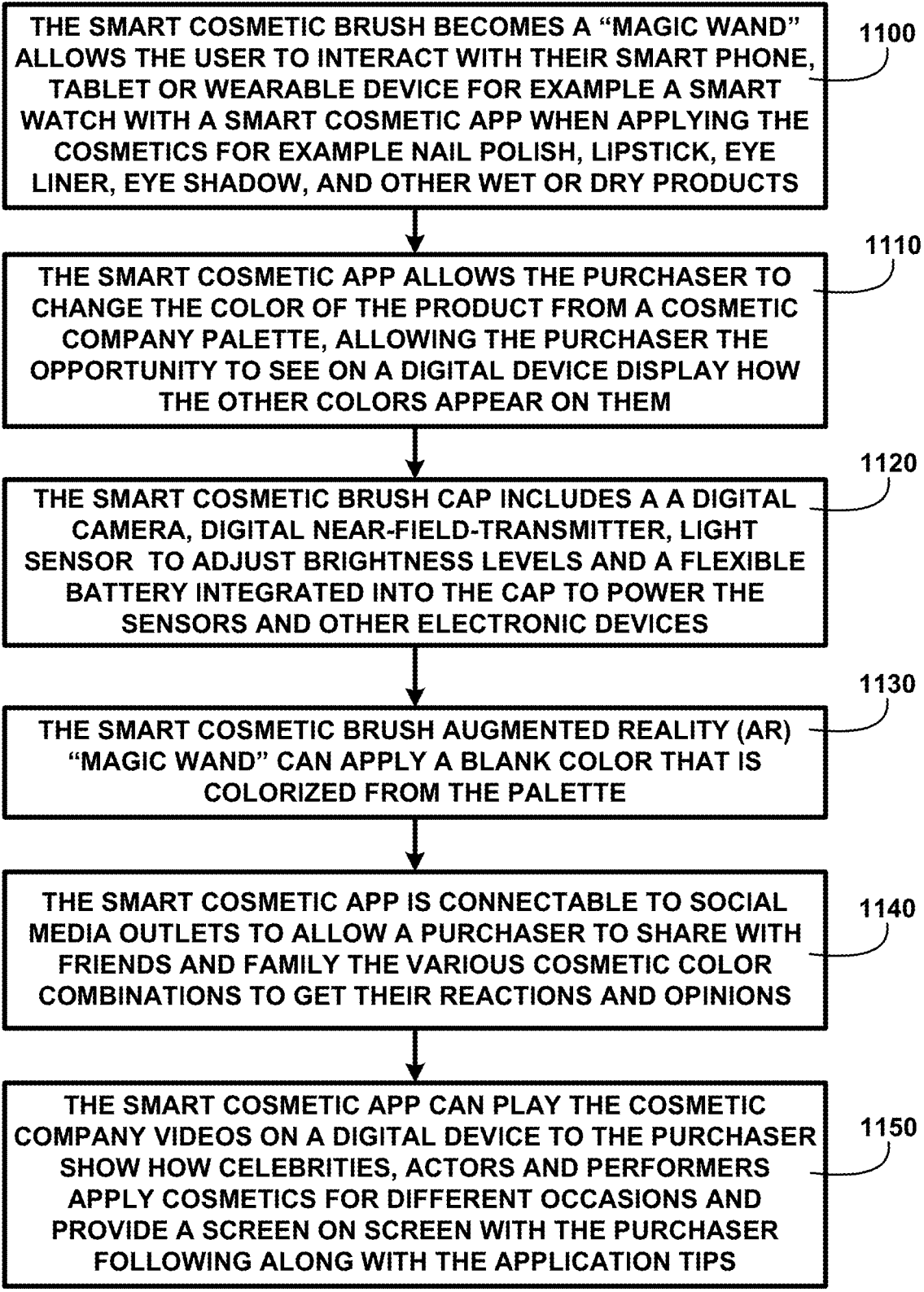
FIG. 11 shows a block diagram of an overview of smart cosmetic brush of one embodiment.

Smart Cosmetic Brush:

FIG. 11 shows a block diagram of an overview of smart cosmetic brush of one embodiment. FIG. 11 shows the smart cosmetic brush becomes a "magic wand" allows the user to interact with their smart phone, tablet or wearable device for example a smart watch with a smart cosmetic app when applying the cosmetics for example nail polish, lipstick, eye liner, eye shadow, and other wet or dry products 1100. The smart cosmetic app allows the purchaser to change the color of the product from a cosmetic company palette, allowing the purchaser the opportunity to see on a digital device display how the other colors appear on them 1110.

The smart cosmetic brush cap includes a digital camera, digital near-field-transmitter, light sensor to adjust brightness levels and a flexible battery integrated into the cap to power the sensors and other electronic devices 1120. The smart cosmetic brush augmented reality (AR) "magic wand" can apply a blank color that is colorized from the palette 1130. The smart cosmetic app is connectable to social media outlets to allow a purchaser to share with friends and family the various cosmetic color combinations to get their reactions and opinions 1140. The smart cosmetic app can play the cosmetic company videos on a digital device to the purchaser show how celebrities, actors and performers apply cosmetics for different occasions and provide a screen on screen with the purchaser following along with the application tips 1150 of one embodiment.

Figure 12:
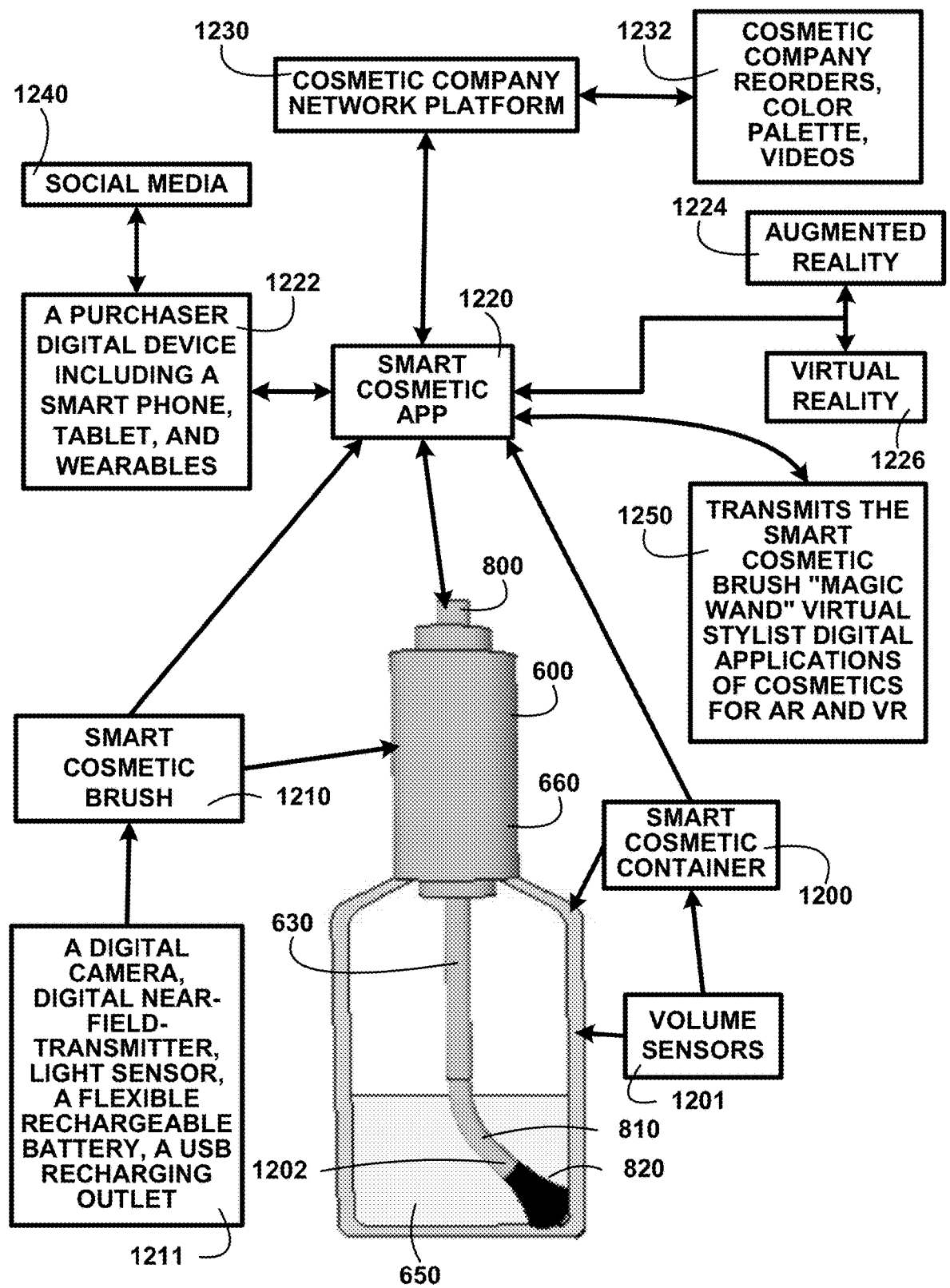
FIG. 12 shows for illustrative purposes only an example of smart cosmetic app of one embodiment.

Smart Cosmetic App:

FIG. 12 shows for illustrative purposes only an example of smart cosmetic app of one embodiment. FIG. 12 shows the flexible extension cap 600 with the plunger in a second stage extended position 800 using the two-stage mechanism not shown 660. The sheath 630 the curved extended flexible extension 810 and angled extended brush 820. The container 620 with the container contents 650. In this embodiment the container 620 is configured as a smart cosmetic container 1200 with volume sensors 1201 for determining the remaining contents of the smart cosmetic container 1200.

In another embodiment the flexible extension cap 600 is configured as a smart cosmetic brush 1210. The smart cosmetic brush 1210 includes a digital camera, digital near-field-transmitter, light sensor, a flexible rechargeable battery, a USB recharging outlet 1211. The smart cosmetic container 1200 and the smart cosmetic brush 1210 are configured to communicate with a smart cosmetic app 1220. The smart cosmetic app 1220 wirelessly couples to a purchaser digital device including a smart phone, tablet, and wearable 1222.

The smart cosmetic app 1220 allows the purchaser to communicate with friends and family on social media 1240 outlets. The purchaser is able to communicate using augmented reality 1224 and virtual reality 1226 with the smart cosmetic app 1220. The smart cosmetic app 1220 transmits the smart cosmetic brush "magic wand" virtual stylist digital applications of cosmetics for AR and VR 1250. A digital pressure sensor 1202 coupled to the base of the brush is activated when for example the brush makes contact with a user's lip when applying lip gloss. The digital pressure sensor 1202 contact detection wirelessly transmits a contact signal to the smart cosmetic app 1220 to begin the color application. The digital pressure sensor 1202 contact signal is also activated for dry cosmetics including eye shadow applied on the eye lid and brow bone.

The smart cosmetic app 1220 also provides the purchaser communications with a cosmetic company network platform 1230. The smart cosmetic container 1200 can make reorders of purchasers selected products through the cosmetic company network platform 1230 and track the reorders for delivery. The registered purchaser can login to the cosmetic company network platform 1230 to access cosmetic company reorders, color palette, videos 1232 and more offered by the cosmetic company network platform 1230 including discounts and special programs and offers. The purchaser and interact with videos on cosmetic applications while viewing a video with cosmetic how to instructions of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A method, comprising:
providing a flexible extension brush housed in a brush sheath coupled to cosmetic brush;
providing a sensor communicatively coupled to the cosmetic brush;
providing a cosmetic container;
providing a cosmetic app on an electronic device configured to receive data from a volume sensor coupled to the cosmetic container and configured to determine when to reorder cosmetic products automatically based on the volume sensor detection of a volume of cosmetic product remaining in the cosmetic container; and
providing a cosmetic app augmented reality system, stored on said electronic device or on another electronic device, configured to receive data from the sensor coupled to the cosmetic brush and configured to create a digital representation of one or more applied cosmetic products on a digital representation of a user to demonstrate on a social media application, how the one or more cosmetic products appear on the user.

2. The method of claim 1, wherein said flexible extension brush further comprises articulated sections that include an extendable last section to reach all interior surfaces of the cosmetic container.

3. The method of claim 1, wherein said flexible extension brush further comprises a flexible extension with an attached cable to cause flexing of a flexible tubing of the flexible extension brush to reach all interior surfaces of the cosmetic container.

4. The method of claim 2, further comprising a two staged plunger action mechanism, wherein a first plunger action of the two staged plunger action mechanism extends the flexible extension brush and a second plunger action of the two staged plunger action mechanism applies pressure to the articulated sections with an attached cable to cause the flexing of the articulated sections.

5. The method of claim 3, further comprising a two staged plunger action mechanism wherein a first plunger action of the two staged plunger action mechanism extends the flexible extension brush and the second plunger action of the two staged plunger action mechanism applies pressure to the flexible extension with the attached cable to cause extension and flexing of the flexible tubing.

6. The method of claim 1, further comprising providing WI-FI and cellular connectivity with the cosmetic app for automatically transmitting a reorder.

7. The method of claim 1, wherein the cosmetic app tracks a reorder and alerts the user when the reorder is arriving.

8. The method of claim 1, further comprising providing a feature of a cosmetic brush for using augmented reality to apply a blank color that is colorized from a color palette.

9. The method of claim 1, further comprising providing a feature of the cosmetic app for simultaneously displaying a video showing how celebrities, actors and/or performers apply cosmetics for different occasions and displaying a video of the user following application tips presented in the video.

10. The method of claim 1, wherein the volume sensor coupled to the cosmetic container is a volume sensor configured to set an adjustable predetermined limit for reordering a cosmetic product stored in the cosmetic container when the volume of the cosmetic product reaches the adjustable predetermined limit.

11. An apparatus, comprising:
a flexible extension brush housed in a brush sheath coupled to a smart cosmetic brush;
a sensor coupled to the smart cosmetic brush;
at least one measure sensor coupled to a smart cosmetic container configured to contain a cosmetic product;
a smart cosmetic app stored on an electronic device configured for analyzing sensor data from the sensor of the smart cosmetic container to detect a volume of cosmetic product in the smart cosmetic container to determine when to reorder the cosmetic product automatically;
an augmented reality system, stored on said electronic device or on another electronic device, coupled to the smart cosmetic app configured to receive data from the sensor coupled to the smart cosmetic brush and configured to create a digital representation of one or more applied cosmetic products on a user of the smart cosmetic brush to demonstrate on a social media application, how the one or more cosmetic products applied with the smart cosmetic brush appear on the user; and wherein the smart cosmetic app is configured to simultaneously display an instructional video for applying the cosmetic product and a display of the user following the instructions from the video.

12. The apparatus of claim 11, wherein the smart cosmetic brush further comprises a flexible extension brush comprised of a flexible extension with an attached cable configured to cause flexing of a flexible tubing to reach all interior surfaces of the smart cosmetic container.

13. The apparatus of claim 11, wherein the smart cosmetic brush further comprises a flexible extension brush comprised of articulated sections that include an extendable last section configured to reach all interior surfaces of the smart cosmetic container.

14. The apparatus of claim 13, further comprising a two staged plunger action mechanism configured to first extend the smart cosmetic brush and then apply pressure to the articulated sections with an attached cable to cause flexing of the articulated sections.

15. The apparatus of claim 11, wherein the measure sensor coupled to the smart cosmetic container is a smart cosmetic container volume sensor configured to set an adjustable predetermined limit for reordering the cosmetic product stored in the smart cosmetic container when the volume of the cosmetic product in the smart cosmetic container reaches the adjustable predetermined limit.

16. An apparatus, comprising:
a cosmetic brush coupled to a flexible extension cap configured with a brush sheath including a flexible extension brush housed within the brush sheath;
a sensor coupled to the smart cosmetic brush;
a cosmetic container, containing a cosmetic product, attachable to the cosmetic brush;
a measure sensor coupled to the cosmetic container configured for detection of a remaining volume of the cosmetic product of the cosmetic container;
a cosmetic app stored on an electronic device configured for receiving reorders of the cosmetic product from the cosmetic container measure sensor and transmitting the reorders automatically, based on the measure sensor detection of the remaining contents volume of the cosmetic product; and
an augmented reality system, stored on said electronic device or on another electronic device, coupled to the cosmetic app configured to receive data from the sensor coupled to the smart cosmetic brush and configured to create a digital representation of one or more applied cosmetic products on a digital representation of a user to demonstrate on a social media application how the one or more cosmetic products appear on the user.

17. The apparatus of claim 16, further comprising a two staged mechanism configured with a first plunger action configured to extend the cosmetic brush and a second plunger action to apply pressure to a flexible extension of the cosmetic brush, and
wherein a cable attached to the cosmetic brush is configured to cause an extension and flexing of flexible tubing of the cosmetic brush.

18. The apparatus of claim 16, wherein the measure sensor coupled to the cosmetic container is a volume sensor configured for setting an adjustable predetermined limit for reordering the cosmetic product in the cosmetic container when the volume of the cosmetic product in the cosmetic container reaches the adjustable predetermined limit.

19. The apparatus of claim 16, wherein the cosmetic brush includes a flexible extension brush configured with articulated sections and an extendable last section to create a curved extended brush for reaching all interior surfaces of the cosmetic container.

20. The apparatus of claim 19, wherein the flexible extension brush further comprises an attached cable to cause flexing of a flexible tubing on the cosmetic brush configured to reach all interior surfaces of the cosmetic container.

\* \* \* \* \*